United States Patent
Byun et al.

(10) Patent No.: US 12,231,216 B2
(45) Date of Patent: Feb. 18, 2025

(54) IN-HOME RELAY DEVICE AND ELECTRONIC DEVICE CONNECTED THERETO

(71) Applicant: SAMSUNG ELECTRONICS CO., LTD., Suwon-si (KR)

(72) Inventors: Ikjoo Byun, Suwon-si (KR); Kyoungjin Moon, Suwon-si (KR); Hyunseok Yoo, Suwon-si (KR); Myunghwan Lee, Suwon-si (KR); Jongbum Woo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 338 days.

(21) Appl. No.: 17/674,887

(22) Filed: Feb. 18, 2022

(65) Prior Publication Data
US 2022/0173793 A1    Jun. 2, 2022

Related U.S. Application Data

(63) Continuation of application No. PCT/KR2020/011333, filed on Aug. 25, 2020.

(30) Foreign Application Priority Data

Sep. 3, 2019    (KR) .................. 10-2019-0109160

(51) Int. Cl.
*H04B 7/155*    (2006.01)
*G01J 1/42*    (2006.01)
(Continued)

(52) U.S. Cl.
CPC ........ *H04B 7/15507* (2013.01); *G01J 1/4204* (2013.01); *G01K 3/005* (2013.01);
(Continued)

(58) Field of Classification Search
CPC .. H04B 7/15507; H04B 17/318; H04B 17/40; H04B 17/23; H04B 7/15528;
(Continued)

(56) References Cited

U.S. PATENT DOCUMENTS 5,771,015 A * 6/1998 Kirtman ................. H01Q 21/28
                                                    342/359
5,819,185 A * 10/1998 Umezawa .......... H04B 7/18571
                                                    343/702

(Continued)

FOREIGN PATENT DOCUMENTS

EP    1 226 673    7/2002
JP    2012-054735    3/2012
(Continued)

OTHER PUBLICATIONS

Office Action dated Nov. 21, 2023 in corresponding Korean Patent Application No. 10-2019-0109160 and English-language translation.

(Continued)

*Primary Examiner* — Jinsong Hu
*Assistant Examiner* — Rui M Hu
(74) *Attorney, Agent, or Firm* — Nixon & Vanderhye, P.C.

(57) ABSTRACT

An in-home relay device according to various embodiments may comprise: a housing; an antenna provided in the housing; an antenna alignment unit including a motor and/or circuitry for changing the position of the antenna so as to change the radiation direction of the antenna; a processor operatively connected to the antenna and the antenna alignment unit; and a communication unit including communication circuitry electrically connected to the processor and configured to wirelessly connect to external electronic devices, wherein the processor may be configured to: control (Continued)

the antenna alignment unit based on the quality of signals transmitted or received through the antenna to secure a line of sight (LOS) between the antenna and a repeater.

9 Claims, 11 Drawing Sheets

(51) Int. Cl.
G01K 3/00 (2006.01)
G06V 20/20 (2022.01)
H01Q 1/42 (2006.01)
H01Q 3/08 (2006.01)
H04B 17/318 (2015.01)
H04B 17/40 (2015.01)

(52) U.S. Cl.
CPC .............. H01Q 1/42 (2013.01); H01Q 3/08 (2013.01); H04B 17/318 (2015.01); H04B 17/40 (2015.01); G06V 20/20 (2022.01)

(58) Field of Classification Search
CPC ......... G01J 1/4204; G01K 3/005; H01Q 1/42; H01Q 3/08; H01Q 1/007; H01Q 1/428; H01Q 3/04; H01Q 1/125; H01Q 1/241; H01Q 3/02; H01Q 21/06; G06V 20/20; G06V 10/70
See application file for complete search history.

(56) References Cited

U.S. PATENT DOCUMENTS

| | | | | |
|---|---|---|---|---|
| 6,150,987 | A * | 11/2000 | Sole | H01Q 3/02 455/437 |
| 6,278,405 | B1 * | 8/2001 | Ha | H01Q 1/1257 342/359 |
| 7,397,425 | B2 * | 7/2008 | Ranta | H01Q 1/007 455/562.1 |
| 7,633,893 | B2 | 12/2009 | Grindahl et al. | |
| 8,380,184 | B2 | 2/2013 | Kamdar et al. | |
| 8,478,299 | B2 * | 7/2013 | Chatterjee | H04W 64/00 455/434 |
| 8,830,081 | B2 | 9/2014 | Aguirre et al. | |
| 9,077,649 | B2 | 7/2015 | Kotecha et al. | |
| 9,337,916 | B2 * | 5/2016 | Ahn | H04B 7/10 |
| 9,485,667 | B2 | 11/2016 | Kamdar et al. | |
| 10,608,729 | B1 * | 3/2020 | Youtz | H04W 24/02 |
| 10,812,992 | B1 * | 10/2020 | Tran | H04B 7/0695 |
| 10,841,023 | B2 * | 11/2020 | Patel | H04W 48/18 |
| 10,903,894 | B1 * | 1/2021 | Dash | H04L 5/006 |
| 10,978,799 | B2 * | 4/2021 | Wu | H01Q 3/02 |
| 11,005,538 | B2 * | 5/2021 | Abedini | H04B 7/026 |
| 11,595,110 | B1 * | 2/2023 | Zhan | H04B 7/15535 |
| 2002/0164945 | A1 * | 11/2002 | Olsen | H04B 10/40 342/350 |
| 2004/0160928 | A1 * | 8/2004 | Perlman | H04W 88/08 370/400 |
| 2004/0236547 | A1 | 11/2004 | Rappaport et al. | |
| 2006/0227048 | A1 * | 10/2006 | Mak | H01Q 21/08 342/359 |
| 2008/0248813 | A1 * | 10/2008 | Chatterjee | G01S 5/02524 455/456.2 |
| 2009/0086655 | A1 | 4/2009 | Ghadaksaz | |
| 2009/0224988 | A1 * | 9/2009 | Park | H01Q 3/08 343/703 |
| 2011/0244892 | A1 * | 10/2011 | MacManus | H04W 4/02 455/457 |
| 2011/0312269 | A1 * | 12/2011 | Judd | G01S 19/25 455/11.1 |
| 2012/0076116 | A1 * | 3/2012 | O'Connor | H01Q 1/08 343/702 |
| 2012/0094594 | A1 * | 4/2012 | Rofougaran | G06F 3/017 455/556.1 |
| 2013/0288593 | A1 * | 10/2013 | Norin | H04N 7/106 455/12.1 |
| 2015/0155904 | A1 * | 6/2015 | Ingalls | H01Q 21/28 455/562.1 |
| 2015/0162973 | A1 * | 6/2015 | Kamimura | H04B 7/15528 455/9 |
| 2016/0192208 | A1 | 6/2016 | Zierdt et al. | |
| 2016/0269132 | A1 * | 9/2016 | Clark | H04B 17/318 |
| 2016/0315392 | A1 * | 10/2016 | Tanabe | H01Q 3/20 |
| 2017/0025839 | A1 | 1/2017 | Bennett et al. | |
| 2017/0237161 | A1 * | 8/2017 | Roy | H01Q 19/19 343/757 |
| 2018/0175498 | A1 * | 6/2018 | Kurniawan | H01Q 3/005 |
| 2018/0294866 | A1 * | 10/2018 | Ashworth | H04B 7/15507 |
| 2019/0089449 | A1 * | 3/2019 | Yoshimura | H04B 17/12 |
| 2019/0123805 | A1 * | 4/2019 | Zhan | H04Q 1/08 |
| 2019/0181940 | A1 | 6/2019 | Liang et al. | |
| 2020/0142388 | A1 * | 5/2020 | Maggiore | H04W 4/33 |
| 2020/0274609 | A1 * | 8/2020 | Youtz | H04W 16/28 |
| 2020/0303820 | A1 * | 9/2020 | Jang | H01Q 15/14 |
| 2021/0050660 | A1 * | 2/2021 | Anderson | H01Q 3/04 |
| 2021/0159990 | A1 * | 5/2021 | Meylan | G08B 7/06 |
| 2021/0368309 | A1 * | 11/2021 | Lupper | H04W 4/33 |
| 2022/0085868 | A1 * | 3/2022 | Facca | H01Q 3/04 |
| 2022/0109493 | A1 * | 4/2022 | Ashworth | H04B 7/15578 |
| 2022/0231399 | A1 * | 7/2022 | Brown | H01Q 1/1221 |
| 2022/0365174 | A1 * | 11/2022 | Mihlin | H01Q 3/267 |

FOREIGN PATENT DOCUMENTS

| | | |
|---|---|---|
| KR | 20-2000-0014544 U | 7/2000 |
| KR | 10-2010-0032874 | 3/2010 |
| KR | 10-2010-0036057 | 4/2010 |
| KR | 10-1096240 | 12/2011 |
| KR | 10-1540463 | 7/2015 |
| WO | 2019/016593 | 1/2019 |

OTHER PUBLICATIONS

Partial Supplementary European Search Report issued Aug. 10, 2022 in corresponding EP Patent Application No. 20860921.4.
Extended European Search Report issued 2022-11-10 in corresponding EP Patent Application No. 20860921.4.
International Search Report for PCT/KR2020/011333 mailed Nov. 25, 2020, 7 pages.

* cited by examiner

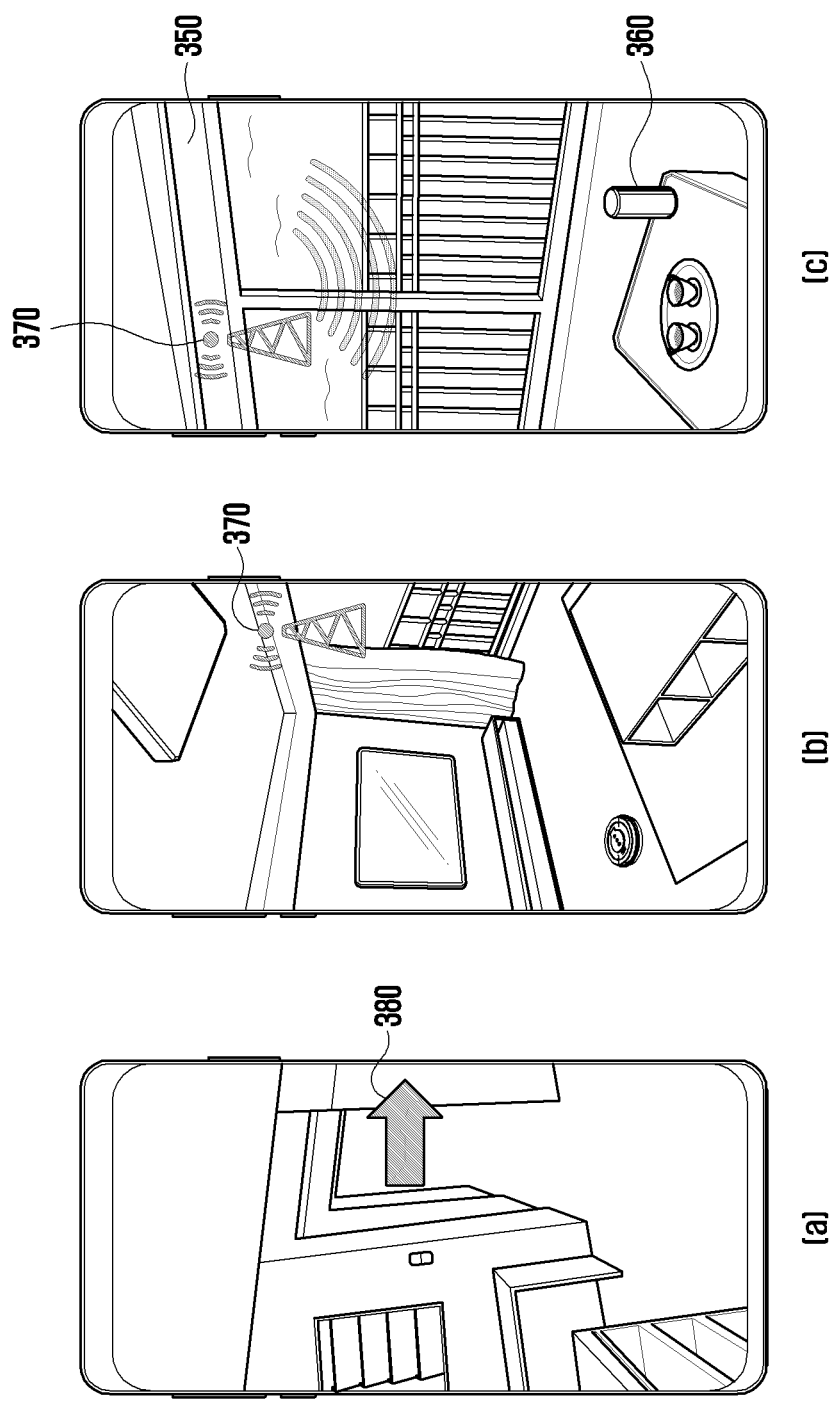

IN-HOME RELAY DEVICE AND ELECTRONIC DEVICE CONNECTED THERETO

CROSS-REFERENCE TO RELATED APPLICATIONS

This application is a continuation of International Application No. PCT/KR2020/011333 designating the United States, filed on Aug. 25, 2020, in the Korean Intellectual Property Receiving Office and claiming priority to Korean Patent Application No. 10-2019-0109160, filed on Sep. 3, 2019, in the Korean Intellectual Property Office, the disclosures of which are incorporated by reference herein in their entireties.

BACKGROUND

Field

The disclosure relates to an in-home relay device capable of 5G wireless communication, and an electronic device connected thereto.

Description of Related Art

In order to satisfy wireless data traffic demands that have been increasing since commercialization of 4G communication systems, there have been efforts to develop improved 5G communication systems or pre-5G communication systems. For such a reason, 5G communication systems or pre-5G communication systems are referred to as Beyond 4G Network communication systems or Post LTE communication systems.

In order to accomplish high data transmission rates, 5G communication systems are also implemented in ultra-high frequency (mmWave) bands (for example, 28 GHz or 39 GHz band).

5G communication systems have the advantage of higher data transmission rates than legacy networks including previous communication (for example, 2G, 3G, 4G, or long term evolution (LTE)) networks.

In order to implement high data transmission rates, 5G communication systems may use ultra-high frequency (mmWave) bands such as 28 GHz or 39 GHz. Ultra-high frequencies have physical characteristics such as very strong linearity and resistance to diffraction.

In line with development of communication technologies, there has been an increasing interest in technologies for connecting domestic information home appliances to networks, and a number of technologies have thus been developed to connect domestic information home appliances to an external device, such as a server of a business operator network, through the Internet, and to manage the same.

SUMMARY

Embodiments of the disclosure may provide an installation location of an in-home relay device such that the in-home relay device can efficiently receive 5G communication signals in ultra-high frequency bands. The installation location of the in-home relay device may be at a location that secures a line of sight (LOS) between the in-home relay device and a repeater, and an antenna inside the in-home relay device may be aligned. In addition, various functions for maintaining/managing the in-home relay device may be provided.

An in-home relay device according to various example embodiments disclosed herein may include: a housing, an antenna provided in the housing, an antenna alignment unit comprising circuitry configured to change the location of the antenna such that the radiation direction of the antenna is changed, a processor operatively connected to the antenna and the antenna alignment unit, and a communication unit comprising communication circuitry electrically connected to the processor and wirelessly connected to an external electronic device, wherein the processor is configured to: control the antenna alignment unit, based on the quality of signals transmitted or received through the antenna to secure a line of sight (LOS) between the antenna and a repeater.

An electronic device according to various embodiments disclosed herein may include: a display, a sensor module including at least one sensor, a communication module comprising communication circuitry, and a processor operatively connected to the display, the sensor module, and the communication module, wherein the processor is configured to: confirm a current location based on at least one of location information received through the sensor module or input location information, confirm the location of a repeater existing within a distance specified based on the current location, and control the display to display a direction of the repeater with respect to the current location on the display.

According to various example embodiments disclosed herein, an in-home relay device, which is commonly disposed inside a building, may be installed in a position that enables efficient transmission or reception of 5G communication signals.

In addition, an in-home relay device according to various example embodiments disclosed herein may have an antenna aligned in a position that enables efficient transmission or reception of 5G communication signals, and the in-home relay device may be maintained and managed such that the in-home relay device can be used continuously.

BRIEF DESCRIPTION OF THE DRAWINGS

In connection with the description of the drawings, the same or similar reference numerals may be used for the same or similar components. Further, the above and other aspects, features and advantages of certain embodiments of the present disclosure will be more apparent from the following detailed description, taken in conjunction with the accompanying drawings, in which:

FIGS. 3A, 3B and 3C are diagrams illustrating example methods of proposing an installation location of an in-home relay device according to various embodiments;

DETAILED DESCRIPTION

Figure 1:
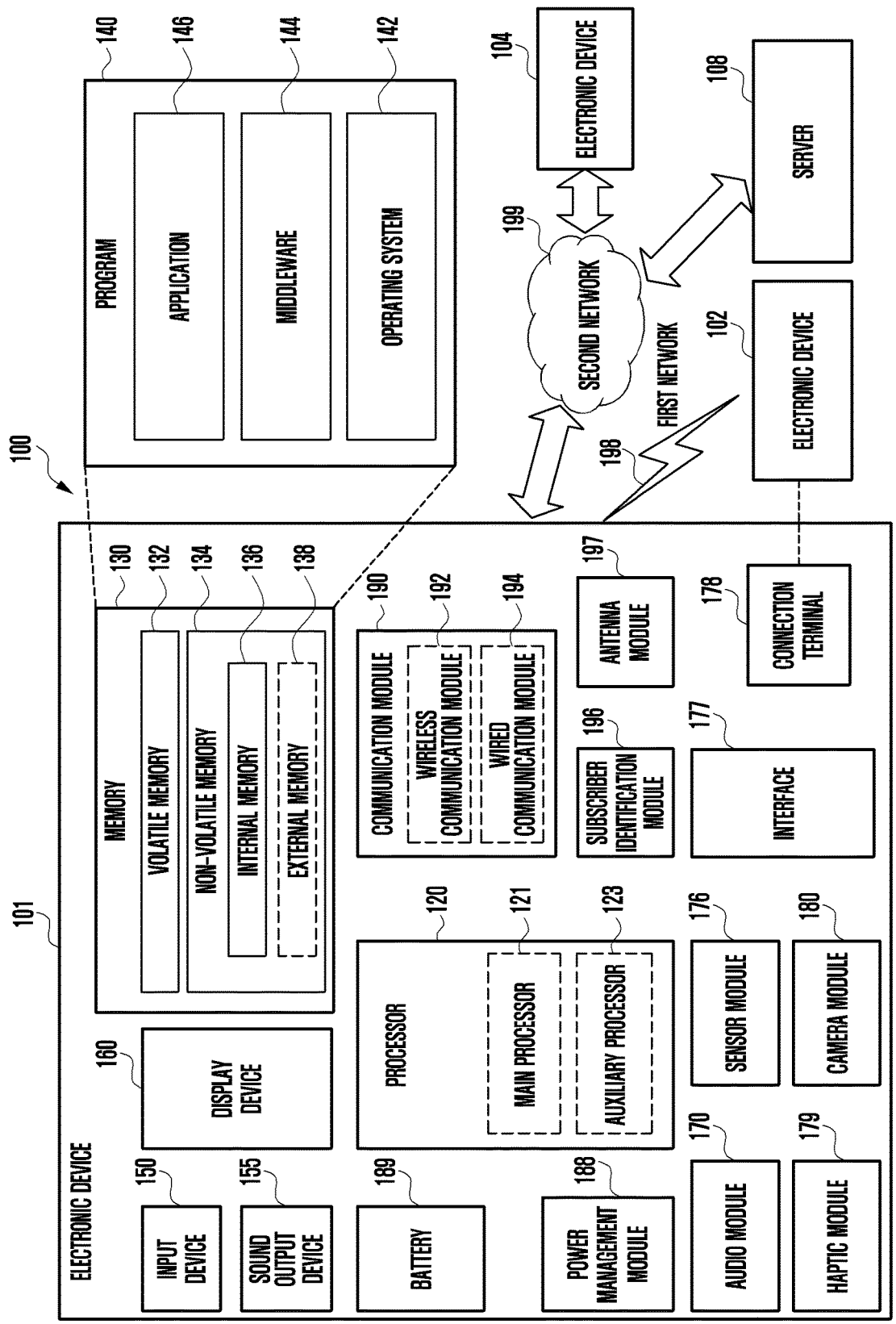
FIG. 1 is a block diagram illustrating an example electronic device in a network environment, according to various embodiments.

It should be appreciated that various example embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The in-home relay device (e.g., the in-home relay device 400 of FIG. 4A) described below may refer, for example, to a device that enables a high-speed Internet service using 5G communication provided by an Internet service provider (hereinafter referred to as "communication company") to be smoothly provided at home or in the office. The in-home relay device may refer to, for example, customer premises equipment (CPE). For example, the in-home relay device may include a broad band router. The in-home relay device may receive a 5G communication signal transmitted from a repeater installed by an Internet service provider and be connected to an electronic device at home or in the office via various wireless protocols such that a high-speed Internet service is available in the electronic device. Various wireless protocols may include short-range wireless communication protocols such as Wi-Fi and Bluetooth.

Figure 2:
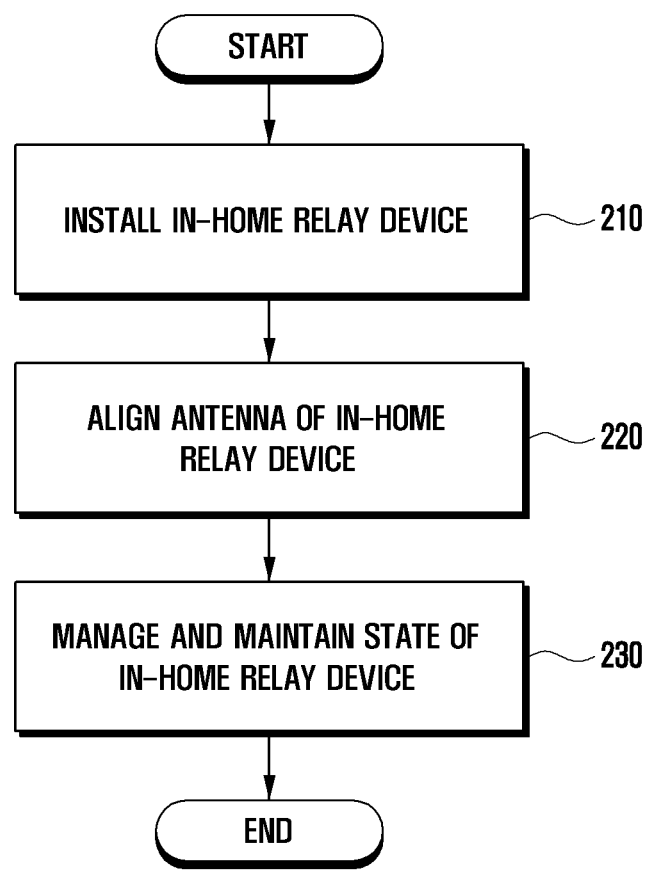
FIG. 2 is a flowchart illustrating an example process of installing, aligning, and managing and maintaining an in-home relay device according to various embodiments.

FIG. 2 is a flowchart illustrating an example process of installing, aligning, and managing and maintaining an in-home relay device (e.g., the in-home relay device 400 of FIG. 4A) according to various embodiments. Referring to FIG. 2, the installation, alignment, and maintenance of the in-home relay device may include installing the in-home relay at an installation location 210, aligning an antenna of the in-home relay device 220, and managing and maintaining the state of the in-home relay device 230. The flowchart shown in FIG. 2 is only an example, and the description of the disclosure is not limited to the description shown in FIG. 2. For example, the order of the processes shown in FIG. 2 is changeable, and omission of a specific process may be possible as well.

Figure 3A:
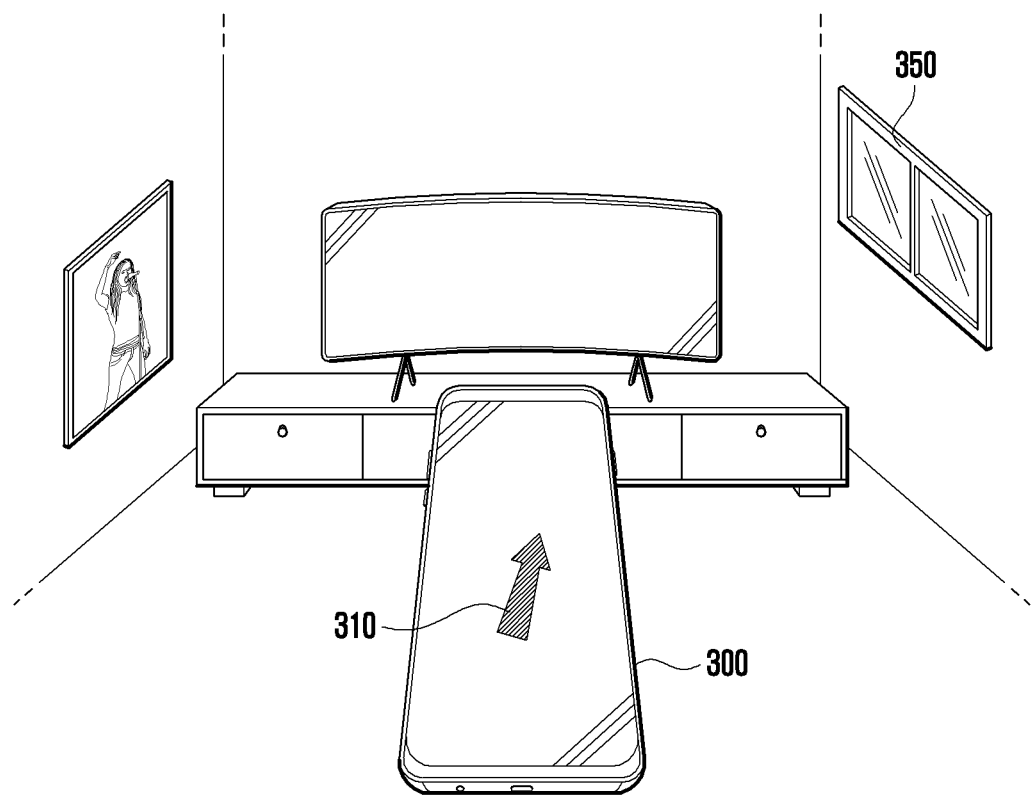
Figure 3B:
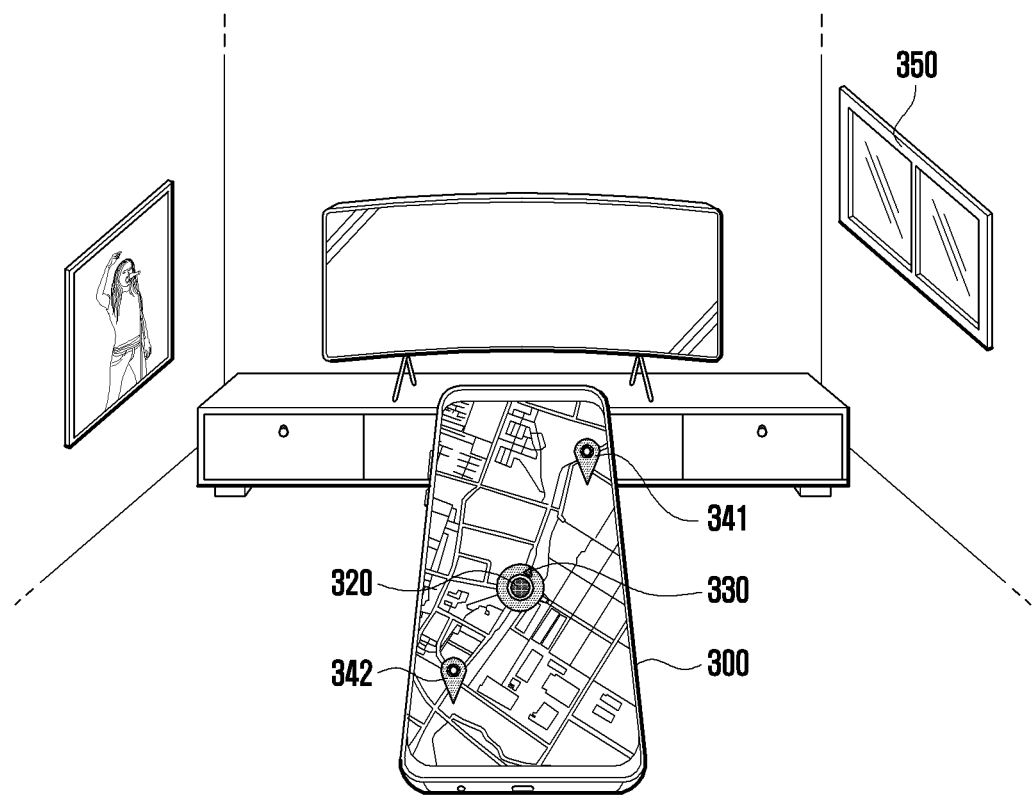

Installing an in-home relay device (e.g., the in-home relay device 400 of FIG. 4A) at a proposed installation location will be described with reference to FIGS. 3A, 3B and 3C (which may be referred to herein as "FIGS. 3A to 3C"). FIGS. 3A to 3C illustrate example methods of proposing an installation location of an in-home relay device according to various embodiments.

According to various embodiments, an installation location may be suggested through a separate electronic device. The electronic device may be, for example, the electronic device 101 of FIG. 1. The electronic device may be a device such as a smartphone, a tablet PC, or a laptop, but is not limited thereto. The electronic device described below may refer to various devices including a display (e.g., the display device 160 of FIG. 1) for displaying information, a sensor module (e.g., the sensor module 176 of FIG. 1) including various sensor devices, a communication module (e.g., the communication module 190 of FIG. 1) wirelessly connected to an in-home relay device, and a processor (e.g., the processor 120 of FIG. 1) operatively connected to the display, the sensor module, and the communication module. For the display, sensor module, communication module, and processor of the electronic device described below will be described without separate reference numbers.

The 5G communication signal may employ the millimeter wave (mmWave) band, which corresponds to the ultra-high frequency band. The in-home relay device may be preferably installed at a location at which the repeater and the line of sight (LOS) can be secured, in order to smoothly receive the communication signal in the ultra-high frequency band. For this reason, it may be preferable that the in-home replay device that receives the 5G communication signal be installed near a transmissive outer wall. The transmissive outer wall may refer to a wall made of a material through which high frequency waves can pass. A typical example of such a transmissive outer wall may be a window (e.g., the window 350 of FIGS. 3A to 3C).

According to various embodiments, the processor may determine the current location of the electronic device through location information received, for example, through a global navigation satellite system (GNSS) sensor included in the sensor module. The GNSS sensor may be a generic term for sensors using a satellite navigation system in which the location, altitude, and speed of an object moving around the earth are obtained using radio waves sent from artificial satellites. Examples of such GNSS may include GPS, GLONASS, Galileo, SBAS, etc. According to various embodiments, the processor may confirm the current location of the electronic device through location information input from a user. The user may input an address of a location at which the in-home relay device is to be installed into the electronic device. In addition, the processor may confirm the current location of the electronic device through various methods.

The processor may confirm a location of a repeater that is adjacent or nearby to the current location of the electronic device. The processor may confirm the location of the adjacent (the term "adjacent" as used herein includes both directly and indirectly adjacent (at a given distance)) or nearby repeater by map data provided from the server and map data input in advance. In addition, the processor of the electronic device may confirm a location of the adjacent repeater through various methods. The processor may determine, as an adjacent repeater, a repeater existing within a distance predetermined (e.g., specified) based on the current location. The predetermined (e.g., specified) distance may be configured by comprehensively considering various data including the effective relay range of the repeater and existing connection data of the repeater.

The processor may confirm the direction of the adjacent repeater with respect to the current location using a geomagnetic field sensor included in the sensor module. The direction of the electronic device may be confirmed through various sensor devices capable of confirming the direction of the electronic device, in addition to the geomagnetic field sensor.

According to various embodiments, the processor may display the direction of the electronic device with respect to an adjacent repeater on the display. For example, as shown in FIG. 3A, the direction of an adjacent repeater may be displayed on the display 300 by, for example, an arrow 310. According to circumstances, as shown in FIG. 3B, the current location 320 and the locations 341 and 342 of adjacent repeaters may be displayed together on the display 300 displaying a map-related application, and the direction 330 of an adjacent repeater may be displayed on the map. The direction 330 of an adjacent repeater may be displayed to face the location 341 of a closer repeater with respect to the current location 320 among the adjacent repeaters. The direction 330 of an adjacent repeater may be displayed to face a specific repeater among a plurality of adjacent repeaters using information of the adjacent repeaters. For example, the direction 330 of an adjacent repeater may be displayed to face the repeater that transmits the strongest signal.

The direction may be displayed on the display in various ways such that a user can confirm the direction of an adjacent repeater with respect to the current location. The user may confirm the direction displayed on the display and may confirm the installation location of the in-home relay device. As described above, it may be preferable for the in-home relay device to be installed near a transmissive outer wall such as a window. The user may determine the installation location of the in-home relay device to be adjacent to the location of the in-home window by confirming the direction displayed on the display.

According to various embodiments, the installation location of the in-home relay device may be displayed on the display in an augmented reality (AR) method as shown in FIG. 3C. In order to suggest the installation location of the in-home relay device through the AR, the electronic device may further include a camera module (e.g., the camera module 180 of FIG. 1) electrically connected to the processor.

The processor may display the installation location 360 of the in-home relay device on a real-time image captured through the camera module. As illustrated in (c) of FIG. 3C, the installation location 360 of the in-home relay device may be displayed as an icon in the shape of the in-home relay device. According to various embodiments, the location 370 of an adjacent repeater may also be displayed together in the form of an icon on the real-time image. As illustrated in (a) of FIG. 3C, when the proposed installation location 360 of the in-home relay device is not available on a screen of a real-time image, the direction 380 of the installation location may be displayed.

As described above, the processor may determine the current location, the location of an adjacent repeater, and the direction of the adjacent repeater with respect to the current location. The processor may display the installation location of the in-home relay device and the location of the repeater on a real-time image captured through the camera module using the above information.

Additional information may be required in order that the in-home relay device is installed on a transmissive outer wall such as a window (e.g., the window 350 of FIG. 3C).

According to various embodiments, the user may directly input the location of the transmissive outer wall. The processor may display the installation location of the in-home relay device on the real-time image, based on the location of the transmissive outer wall at which the ultra-high frequency band wireless signal can be received. For example, the processor may process the location of the transmissive outer wall as priority information to display the installation location of the in-home relay device near the transmissive outer wall.

According to various embodiments, the processor may analyze the image captured through the camera module to determine the location of the transmissive outer wall. For example, the processor may recognize objects captured through the camera module. An object corresponding to the transmissive outer wall among the captured objects may be recognized using a characteristic thereof distinguished from the ambient objects, such as a shape and brightness of a window corresponding to an example of the transmissive outer wall. The processor may process the location of the recognized transmissive outer wall as priority information to display the installation location of the in-home relay device near the transmissive outer wall.

According to various embodiments, the installation location of the in-home relay device may be determined based on signal receiving strength of the in-home relay device displayed on the display. When the user changes the location of the in-home relay device, the signal receiving strength of the in-home relay device may change. The processor may receive signal receiving strength of the in-home relay device through the communication module of the electronic device and display the same on the display in real time. The user may change the location of the in-home relay device while confirming the signal receiving strength displayed on the display, to install the in-home relay device at a location at which a signal receiving strength is good. For example, the user may determine a point at which a signal receiving strength is the highest as the installation location of the in-home relay device.

According to various embodiments, the installation location of the in-home relay device may be determined without a separate electronic device. The in-home relay device (e.g., the in-home relay device 400 of FIG. 4A) may include an indicator (e.g., the indicator 460 of FIGS. 4A to 4D) displaying state information including signal quality. The user may change the location of the in-home relay device while confirming the state information displayed on the indicator. For example, the user may determine a point at which a signal receiving strength is the highest as an installation location of the in-home relay device.

According to various embodiments, the telecommunication company may directly provide the installation location of the in-home relay device. When the user provides current location information to the communication company through the electronic device, the communication company may confirm the location and direction of an adjacent repeater, based on the user's location information and provide information thereof to the user through the electronic device. The user may determine the installation location of the in-home relay device in consideration of the location and direction of the adjacent repeater provided by the communication company.

The installation location of the in-home relay device may be determined by a combination of the above-described embodiments. In addition, the installation location of the in-home relay device may be proposed in various ways.

Figure 4A:
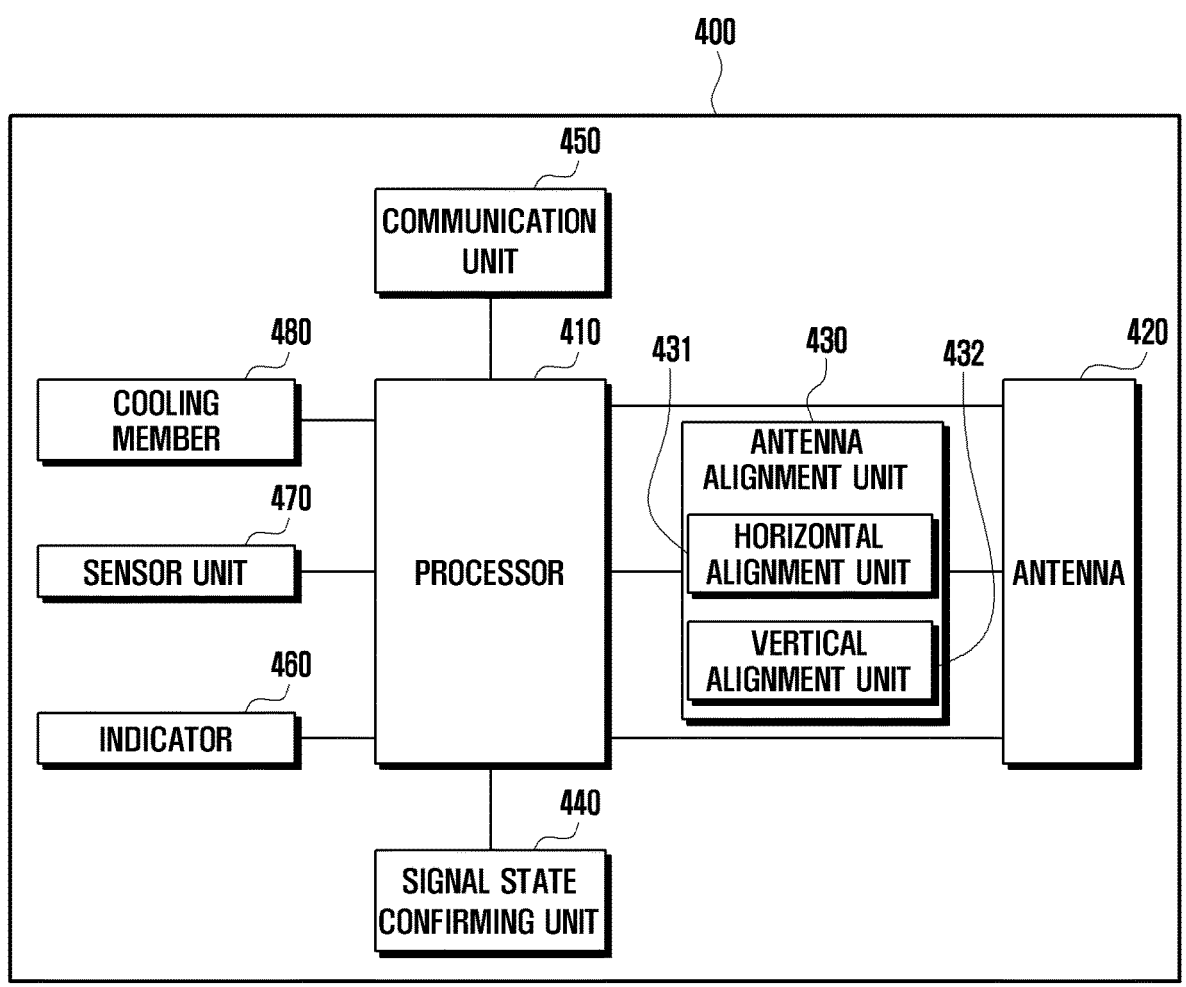
FIG. 4A is a block diagram illustrating an example configuration of an in-home relay device according to various embodiments.
Figure 4B:
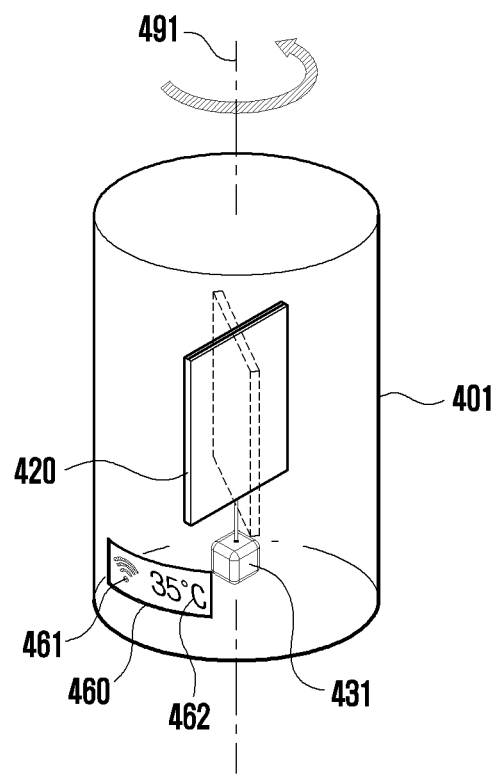
FIGS. 4B, 4C and 4D are diagrams illustrating an example in-home relay device according to various embodiments.
Figure 4C:
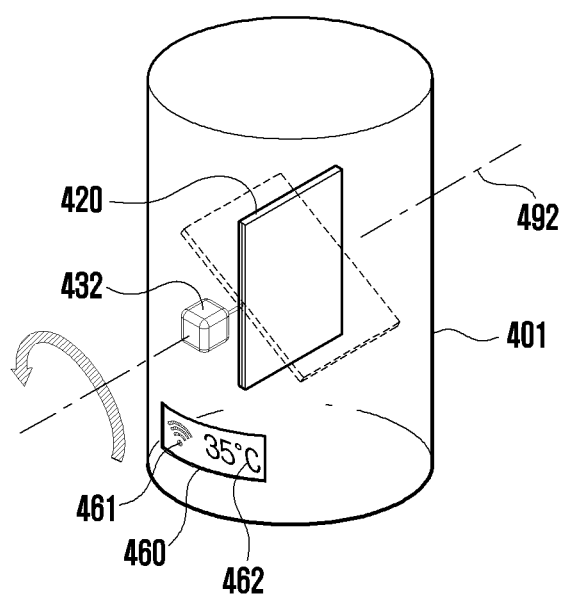

A process of aligning an in-home relay device will be described with reference to FIGS. 4A to 4D. FIG. 4A is a block diagram illustrating an example configuration of an in-home relay device according to various embodiments, FIGS. 4B, 4C and 4D are diagrams illustrating an example in-home relay device according to various embodiments, and FIG. 5 illustrates an example antenna alignment method of an in-home relay device according to various embodiments.

According to various embodiments of the disclosure, the in-home relay device 400 may include a housing 401, an antenna 420, an antenna alignment unit (e.g., including a motor and/or circuitry) 430, a signal state confirming unit (e.g., including various circuitry) 440, an indicator 460, a processor (e.g., including processing circuitry) 410, and a communication unit (e.g., including communication circuitry) 450.

The housing 401 may support various elements of the in-home relay device 400. The housing 401 may be formed in various shapes. For example, as shown in FIG. 4B, the housing 401 may be formed in a cylindrical shape. In addition, the housing 401 may be formed in various shapes. The surface opposite to the antenna 420 in the housing may be a sphere to maintain a uniform air gap of the antenna 420 in a process in which the location of the antenna 420 is changed by the antenna alignment unit 430 to be described in greater detail below. For example, the housing may be formed in a spherical shape overall, and the antenna 420 may be disposed in the center of the housing. In this case, even if the location of the antenna 420 is changed by the antenna alignment unit 430, the air gap of the antenna 420 can be maintained uniformly, and thus calibration according to the change in the air gap of the antenna 420 may be omitted.

Figure 4D:
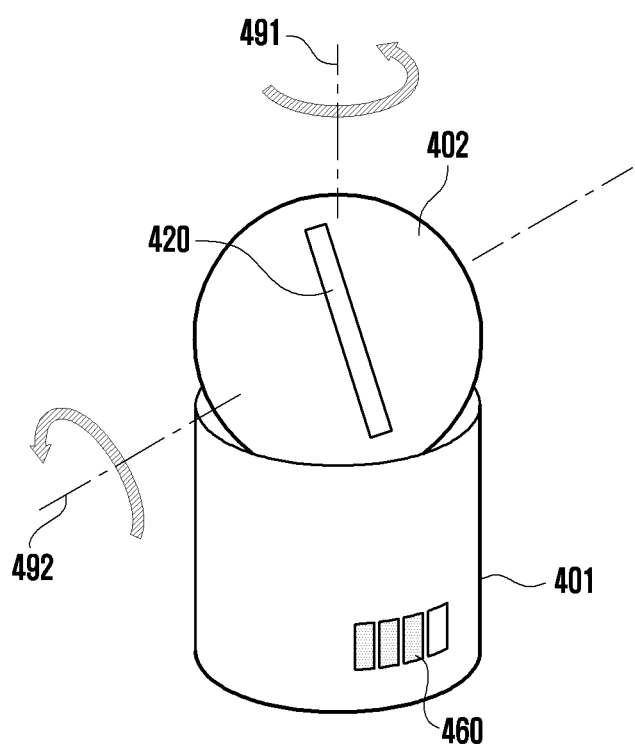
Figure 5:
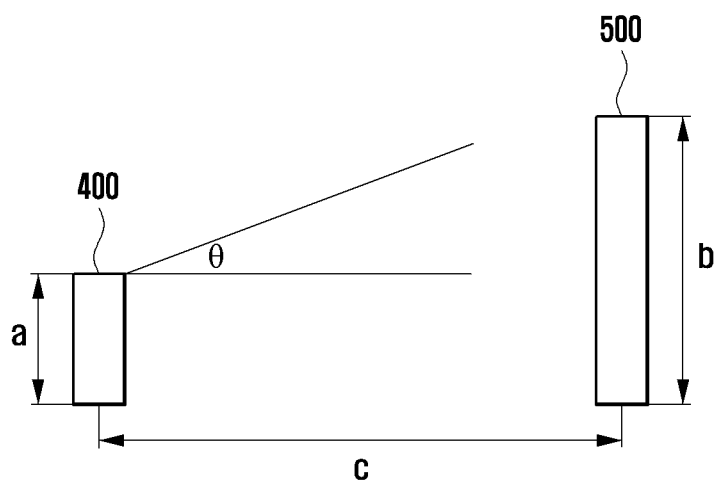
FIG. 5 is a diagram illustrating an example antenna alignment method of an in-home relay device according to various embodiments.

According to circumstances, as shown in FIG. 4D, the antenna 420 may be disposed in a spherical auxiliary housing 402 installed to be movable relative to the housing 401. The antenna alignment unit 430 may move the auxiliary housing 402 relative to the housing 401 to change the direction of the antenna 420. The antenna 420 may be embedded in the spherical auxiliary housing, and the auxiliary housing 402 itself may move with respect to the housing 401 to change the direction of the antenna 420, and accordingly the air gap of the antenna 420 can be maintained uniformly. Therefore, calibration according to the change in the air gap of the antenna 420 may be omitted.

According to various embodiments, the shapes of the housing 401 and the auxiliary housing 402 may be variously changed. For example, the housing 401 and the auxiliary housing 402 may have a cylindrical shape. The antenna 420 may be disposed in the housing 401 such that the position thereof is fixed to the housing 401, and the radiation direction of the antenna 420 disposed in the housing 401 may be changed by rotation of the housing 401 with respect to the auxiliary housing 402. The housing 401 may rotate with respect to the auxiliary housing 402 about the first axis 491 perpendicular to the ground on which the auxiliary housing 402 is installed. The rotation of the housing 401 with respect to the auxiliary housing 402 may be manually performed by a user or may be performed automatically. In this case, the auxiliary housing 402 may be configured to be positioned at the lower end of the housing 401.

According to various embodiments, the auxiliary housing 402 and the housing 401 may be separated from each other. In this case, the auxiliary housing 402 may be fixed at a location at which the in-home relay device 400 is to be installed. After the housing 401 is coupled to the fixed auxiliary housing 402, the radiation direction of the antenna 420 may be changed by rotation of the housing 401 with respect to the auxiliary housing 402.

According to various embodiments, the housing 401 may be installed on a fixed rotatable mount (not shown). The rotatable mount may receive the housing 401 such that the same is rotatable. In a state in which the housing 401 is installed on the rotatable mount, the housing 401 may rotate with respect to the rotatable mount. The radiation direction of the antenna 420 disposed in the housing 401 may be changed by rotation of the housing 401. The rotation of the housing 401 with respect to the rotatable mount may be automatically performed by an actuator such as a motor. In addition, the rotation may be manually performed by a user.

The antenna 420 may be disposed inside the housing 401. The antenna 420 may transmit or receive a radio wave provided by a repeater of a communication company. The formation and design of the antenna 420 may be variously changed according to characteristics of radio waves provided by the repeater. For example, the antenna 420 may receive radio waves in an ultra-high frequency band such as 28 GHz or 39 GHz used for 5G communication. The antenna 420 may include a plurality of antenna 420 sets, and each of the plurality of antenna 420 sets may operate independently. FIGS. 4B, 4C and 4D illustrate the shape of the antenna 420 as a rectangular plate shape for convenience of explanation, but the shape of the antenna 420 may be variously changed as described above.

The antenna alignment unit 430 may include a motor and/or various circuitry and change the location of the antenna 420 such that the radiation direction of radio wave of the antenna 420 is changed. The antenna alignment unit 430 may change the location of the antenna 420 with respect to the housing 401. That is, the location of the antenna 420 may be changed inside the housing 401. The antenna alignment unit 430 may include a horizontal alignment unit 431 configured to rotate the antenna 420 about a first axis 491 perpendicular to the ground on which the housing 401 is installed, as shown in FIG. 4B. For example, the horizontal alignment unit 431 may be a motor that rotates the antenna 420 about the first axis 491. The antenna alignment unit 430 may include a vertical alignment unit 432 configured to rotate the antenna 420 about a second axis 492 perpendicular to the first axis 491, as shown in FIG. 4C. For example, the vertical alignment unit 432 may be a motor that rotates the antenna 420 about the second axis 492.

The signal state confirming unit 440 may include various circuitry and measure signal quality including receiving strength of signals received through the antenna 420. The receiving strength of signals may be measured, for example, by a received signal strength indicator (RSSI). In addition, the signal quality measured by the signal state confirming unit 440 may include values indicating signal quality, such as signal latency and noise included in the signals. According to various embodiments, the signal state confirming unit 440 may be included in the processor 410. For example, the function performed by the above-described signal state confirming unit 440 may be performed by the processor 410.

The indicator 460 may be implemented as an exposed display on the outer surface of the housing 401. As described above, since the location of the antenna 420 is changed inside the housing 401 by the antenna alignment unit 430, the housing 401 can maintain a constant direction even when the location of the antenna 420 is changed. The indicator 460 installed on the outer surface of the housing 401 may maintain a constant direction even when the location of the antenna 420 is changed. Due to this, the user can easily check the indicator 460 even in a process in which the antenna 420 is being aligned. The indicator 460 may display state information. The state information may include signal quality measured by the signal state confirming unit 440, and information measured by the sensor unit 470 including various sensors. The indicator 460 may visually indicate signal quality. The signal receiving strength may be visually displayed 461 on a portion of the display. Information such as temperature may be visually displayed 462 on another portion of the display. According to various embodiments, the indicator 460 may be implemented as a light emitting diode (LED) as shown in FIG. 4D. In this case, the state information may be visually displayed using a method including changing color or intensity of an LED and changing the number of emitting LEDs. In addition, the indicator 460 may express state information in various ways. For example, the indicator 460 may express state information using a tactile sense or auditory sense. When the state information is displayed by tactile sense, the indicator 460 may include a vibration generator. The state information may be expressed according to a vibration pattern generated by the vibration generator. When the state information is displayed by auditory sense, the indicator 460 may include a speaker. The state information may be expressed according to a change in sound output from the speaker.

The communication unit 450 may include various communication circuitry and perform wireless communication with an external electronic device (e.g., the electronic device 101 of FIG. 1). The communication unit 450 may perform wireless communication with an external electronic device using various wireless protocols. For example, the in-home relay device 400 may be connected to an external electronic device using a wireless protocol such as Wi-Fi or Bluetooth.

The sensor unit 470 may include various sensors configured to measure the state of the in-home relay device 400. For example, the sensor unit 470 may include a temperature sensor, a light intensity sensor, an acceleration sensor, a gyro sensor, a geomagnetic field sensor, or a barometer.

A cooling member 480 may include a heat dissipating surface and/or a fan and discharge heat generated inside the housing 401 to the outside of the housing 401 to maintain a constant temperature of the in-home relay device 400. The cooling member 480 may include a member configured to dissipate heat inside the housing 401 to the outside. For example, the cooling member 480 may include a heat dissipation fan or a heat dissipation plate. The cooling member 480 may be disposed adjacent to an element (e.g., the antenna 420 and the processor 410) configured to emit a large amount of heat during the operation, among elements disposed inside the housing 401.

The processor 410 may be operatively connected with the above-described elements. The processor 410 may include various processing circuitry and generally control the in-home relay device 400. The processor 410 may convert an analog signal received through the antenna 420 into a digital signal or convert a digital signal into an analog signal to transmit the converted signal to the antenna 420.

According to various embodiments, the processor 410 may control the antenna alignment unit 430, based on the signal quality measured by the signal state confirming unit 440. For example, the processor 410 may change the direction of the antenna 420 by operating the antenna alignment unit 430. While the direction of the antenna 420 is changed, the signal state confirming unit 440 may confirm the quality of signals received through the antenna 420. The processor 410 may change the radiation direction of the antenna 420 by operating the antenna alignment unit 430 such that the quality of signals received through the antenna 420 becomes the greatest. According to various embodiments, the processor 410 may operate the antenna alignment unit 430 such that the antenna 420 is positioned at a point at which a signal receiving strength is the highest. According to various embodiments, the antenna alignment unit 430 may be a motor configured to change the radiation direction of the antenna 420 with respect to a rotation axis (e.g., the first axis 491 of FIG. 4B and the second axis 492 of FIG. 4C), based on a control signal of the processor 410. According to various embodiments, the antenna alignment unit 430 may be connected to the rotation axis of the antenna 420 and protrude from the outer surface of the housing 401. For example, when the user moves the antenna alignment unit 430 relative to the housing 401, the antenna 420 may rotate about the rotation axis accordingly, and the radiation direction of the antenna 420 may be changed. According to various embodiments, the antenna 420 may be fixed to the housing 401, and the housing 401 to which the antenna 420 is fixed may rotate with respect to a separate housing (e.g., the auxiliary housing 420 of FIG. 4D). In this case, the separate housing may be formed in a cylindrical shape and configured to be positioned at the lower end of the housing 401, and the user may change the direction of the antenna 420 by rotating the housing 401. The user may check receiving strength displayed on the indicator 460 or an external electronic device connected to the in-home relay device 400 to rotate the housing 401 such that the receiving strength is the greatest. The rotation of the housing 401 with respect to the auxiliary housing may be automatically performed by an actuator such as a motor or may be manually performed by a user. The auxiliary housing may be configured to be positioned at the lower end of the housing 401. In an embodiment, the housing 401 may be installed on a rotatable mount (not shown) fixed at a location at which the housing 401 is to be installed. The rotatable mount may receive the housing 401 such that the same is rotatable. The housing 401 installed on the rotatable mount may be rotatable relative to the rotatable mount. The radiation direction of the antenna 420 disposed in the housing 401 may be changed by the rotation of the housing 401. The rotation of the housing 401 relative to the rotatable mount may be automatically performed by an actuator such as a motor. In addition, the rotation may be manually performed by the user.

The alignment of the antenna 420 may be performed in various ways. According to various embodiments, the processor 410 may operate the horizontal alignment unit 431 of the antenna alignment unit 430 to find a location at which receiving strength of the antenna 420 is the greatest. Next, the processor 410 may operate the vertical alignment unit 432 of the antenna alignment unit 430 to find a location at which receiving strength of the antenna 420 is the greatest.

According to various embodiments, the processor 410 may operate the vertical alignment unit 432 of the antenna alignment unit 430 first, and then operate the horizontal alignment unit 431 to find a location at which receiving strength of the antenna 420 is the greatest.

According to various embodiments, the processor 410 may operate the horizontal alignment unit 431 and the vertical alignment unit 432 of the antenna alignment unit 430 at the same time to find a location at which receiving strength of the antenna 420 is the greatest.

According to various embodiments, the processor 410 may receive the direction of a repeater for the current location from the external electronic device through the communication unit 450 and may operate the horizontal alignment unit 431 of the antenna alignment unit 430 accordingly. In this example, the direction of the antenna 420 may be aligned with the direction of the repeater. The processor 410 may operate the vertical alignment unit 432 of the antenna alignment unit 430 to change the vertical angle of the antenna 420. The processor 410 may operate the vertical alignment unit 432 according to the signal quality measured by the signal state confirming unit 440. For example, the vertical alignment unit 432 may be operated such that the receiving strength included in the signal quality is maximized.

According to various embodiments, the processor 410 of the in-home relay device 400 may calculate the vertical angle of the antenna 420 by substituting a variable into a preconfigured equation. Referring to FIG. 5, the processor 410 may use the height (a) of an in-home relay device, the height (b) of a repeater, and the distance (c) between the in-home repeater and the repeater to calculate the optimal vertical angle ($\theta$) of the antenna 420.

The processor 410 may confirm the height (a) of the in-home relay device 400 with respect to the ground. The height (a) of the in-home relay device 400 may be measured through a barometer included in the sensor unit 470 of the in-home relay device 400, may be measured through a GNSS sensor of an external electronic device to be transmitted to the in-home relay device 400, and may be measured through a barometer included in the sensor module of the external electronic device to be transmitted to the in-home relay device 400, and a value directly input into the external electronic device as the height (a) by the user may be transmitted to the in-home relay device 400. The height (b) of the repeater is a predetermined value, and the external electronic device may receive information on the repeater from a server to transmit the value to the in-home relay device 400. The distance (c) between the in-home relay device 400 and the repeater may be calculated by an external electronic device and transmitted to the in-home relay device 400. The optimal vertical angle (θ) of the antenna 420 can be calculated when the height (a) of the in-home relay device 400, the height (b) of the repeater, and the distance (c) between the in-home relay device 400 and the repeater are substituted into the equation below.

$$\theta = \tan^{-1}\frac{b-a}{c}$$

According to various embodiments, a processor (e.g., the processor 120 of FIG. 1) of the external electronic device may calculate the vertical angle (θ) of the antenna 420 via the above values and transmit the result therefrom to the in-home relay device 400.

According to various embodiments, the processor 410 may control the antenna alignment unit 430, based on a control signal of an external electronic device received through the communication unit 450. The user may input an antenna alignment command through the electronic device, and the antenna alignment command input to the electronic device may be converted into a control signal to be transmitted to the in-home relay device 400.

According to various embodiments, the signal state confirming unit 440 of the in-home relay device 400 may measure the signal quality according to the location of the antenna 420 in real time, and the measured signal quality may be continuously transmitted to the electronic device through the communication unit 450. The user may confirm the quality of signals transmitted from the in-home relay device 400 through the display of the electronic device and input an antenna alignment command accordingly. The user may input an antenna alignment command such that the antenna 420 is positioned at a point at which signal receiving strength reaches maximum.

Figure 6:
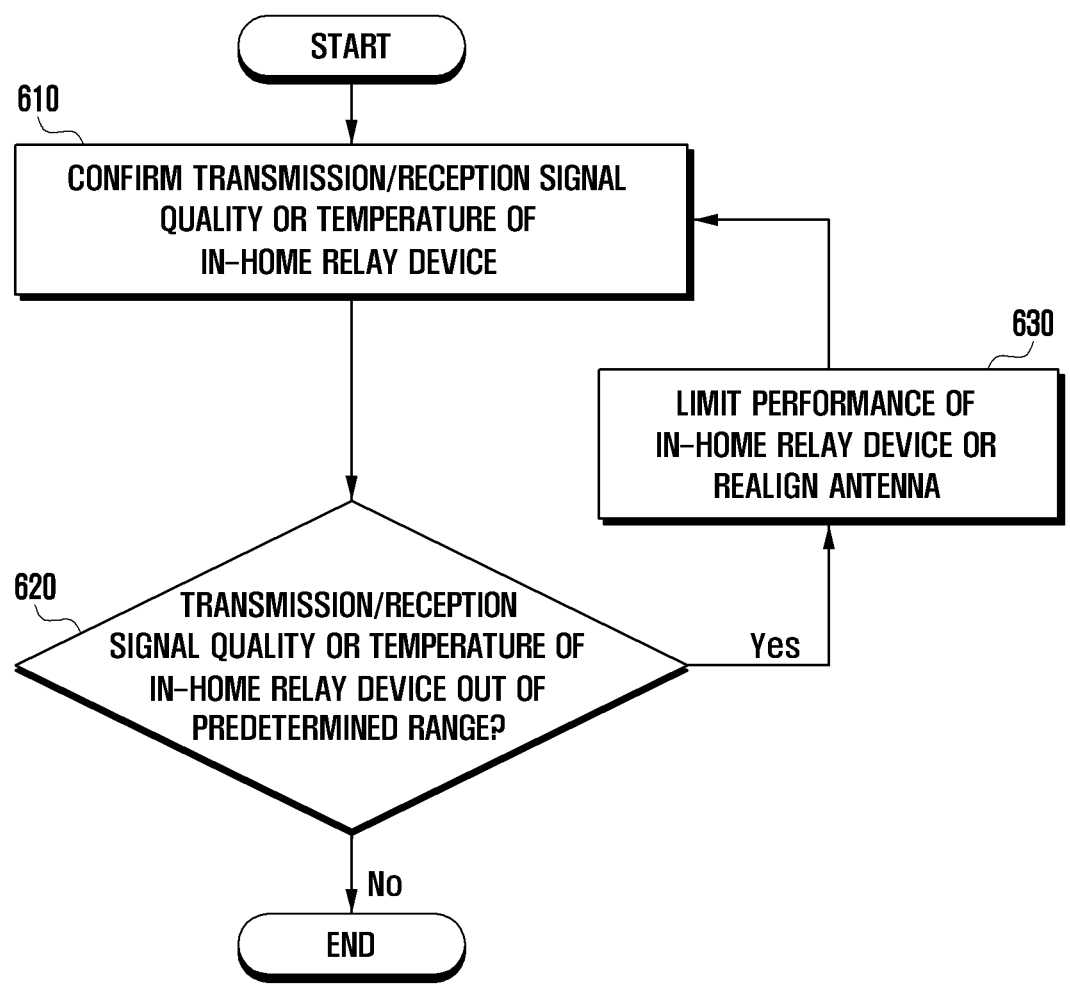
FIG. 6 is a flowchart illustrating an example maintenance and management operation of an in-home relay device according to various embodiments.

FIG. 6 is a flowchart illustrating an example maintenance and management process of an in-home relay device according to various embodiments. FIG. 6 is only an example, and the maintenance and management process of the in-home relay device may be performed in various orders.

The processor 410 may periodically confirm the state of the in-home relay device 400 (610). When the quality of signals received or transmitted through the in-home relay device 400 or an internal state value such as temperature is out of a preconfigured range, the processor 410 may determine that the state of the in-home relay device 400 is abnormal (620). In this case, the processor 410 may limit the performance of the in-home relay device 400 or realign the antenna (630).

According to various embodiments, the processor 410 may periodically confirm the signal quality measured by the signal state confirming unit 440. When the receiving strength included in the measured signal quality is lower than the preconfigured receiving strength, the processor 410 may display an alarm through the indicator 460. In addition, the processor 410 may transmit the alarm to the external electronic device through the communication unit 450 such that the alarm is displayed in the external electronic device (e.g., the electronic device 101 of FIG. 1). The processor 410 may control the antenna alignment unit 430 such that the receiving strength included in the signal quality is greater than or equal to the preconfigured receiving strength.

According to circumstances, the antenna alignment unit 430 may be controlled according to a control command from an external electronic device. Thus, the in-home relay device 400 disclosed herein may periodically confirm the quality of signals received by the antenna 420 such that the receiving strength included in the signal receiving quality of the antenna 420 can be maintained at the preconfigured receiving strength or more.

According to various embodiments, the processor 410 may periodically confirm the state information measured by the sensor unit 470. For example, the processor 410 may periodically confirm the temperature measured by a temperature sensor included in the sensor unit 470. For example, the processor 410 may periodically confirm the light intensity measured by the light intensity sensor which is included in the sensor unit 470 and measures the amount of light incident to the in-home relay device 400. When the measured temperature value or light intensity value is higher than the predetermined temperature or the predetermined light intensity value, the processor 410 may limit the performance of the antenna 420. The temperature rise inside the housing may be reduced by the limitation of the performance of the antenna 420. Accordingly, the quality deterioration of the in-home relay device 400 and the damage to the in-home relay device 400, which are caused by overheating due to the increase in temperature, may be prevented or reduced. As described above, the in-home relay device 400 may be preferably installed adjacent to a light transmissive outer wall. The performance of the in-home relay device 400 may be deteriorated or damaged due to the light excessively incident thereto. The processor 410 may measure light intensity value through the light intensity sensor and limit the performance of the in-home relay device 400 using the measured value to prevent or reduce a situation caused by the light excessively incident thereto.

According to various embodiments, when the temperature measured by the sensor unit 470 is higher than the predetermined temperature, the processor 410 may operate or control the cooling member 480 such that the temperature is lowered again to the predetermined temperature or below.

According to various embodiments, the sensor unit 470 may include, for example, and without limitation, at least one of an acceleration sensor, a gyro sensor, and a geomagnetic field sensor, which are capable of measuring a change in the location of the in-home replay device 400. When the location change of the in-home relay device 400 measured by the acceleration sensor, the gyro sensor, and the geomagnetic field sensor of the sensor unit is greater than the predetermined location change, the processor 410 may determine that realignment of the antenna 420 is necessary because of the location change of the in-home relay device 400. The processor 410 may control the antenna alignment unit 430 such that the receiving strength included in the signal quality is greater than or equal to the preconfigured receiving strength. According to circumstance, the antenna alignment unit 430 may be controlled according to a control command from an external electronic device.

According to various embodiments, the processor 410 may detect that an abnormality occurs in a network constructed by the in-home relay device 400. The processor 410 may periodically transmit IP packets to a network to confirm the response and confirm the state thereof, thereby confirming the state of the network.

According to various embodiments, the processor 410 may limit the performance of the in-home relay device 400 according to a communication amount of the in-home relay device 400. For example, the processor 410 may extract and analyze the trend of a time zone-specific communication amount of the in-home relay device 400. The processor 410 may control such that the performance of the antenna 420 is limited in a time zone in which the communication amount is less than the predetermined communication amount as the result of the analysis. Through such performance control, power consumption can be prevented or reduced and the lifespan of the in-home relay device 400 can be managed.

An in-home relay device according to various example embodiments may include: a housing, an antenna provided in the housing, an antenna alignment unit comprising a motor and/or circuitry configured to change the location of the antenna such that the radiation direction of the antenna is changed, a processor operatively connected to the antenna and the antenna alignment unit, and a communication unit comprising communication circuitry electrically connected to the processor and wirelessly connected to an external electronic device, wherein the processor may be configured to: control the antenna alignment unit, based on the quality of signals transmitted or received through the antenna, to secure a line of sight (LOS) between the antenna and a repeater.

The antenna alignment unit may include a horizontal alignment unit configured to rotate the antenna about a first axis perpendicular to the ground on which the housing is installed, or a vertical alignment unit configured to rotate the antenna about a second axis perpendicular to the first axis.

The housing may be formed such that a surface thereof opposite to the antenna has a sphere shape.

The in-home relay device according to various example embodiments may further include: an auxiliary housing having the antenna disposed therein, having a substantially sphere-shaped surface opposite to the antenna, and is movable relative to the housing, and the antenna alignment unit may be configured to move the auxiliary housing relative to the housing.

The processor may be configured to control the antenna alignment unit such that receiving strength included in the signal quality is maximized at the location at which the housing is installed.

The processor may be configured to control the antenna alignment unit, based on a control signal of an external electronic device received through the communication unit.

The processor may be configured to operate the antenna alignment unit such that, based on receiving strength included in the signal quality being lower than a specified receiving strength, the receiving strength is greater than or equal to the specified receiving strength.

The in-home relay device according to various example embodiments may further include a sensor unit including at least one sensor configured to confirm a state of the in-home relay device, and an indicator configured to display state information including information measured by various sensors included in the sensor unit.

The processor may be configured to control the antenna, the communication unit, and the antenna alignment unit, based on the information measured by various sensors included in the sensor unit.

The sensor unit may include a temperature sensor configured to measure a temperature of the in-home relay device, and the processor may be configured to limit the performance of at least one of the antenna and the communication unit based on the temperature measured by the temperature sensor of the sensor unit being greater than a specified temperature.

The sensor unit may include a light intensity sensor configured to measure the amount of light incident to the in-home relay device, and the processor may be configured to limit the performance of the antenna based on the light intensity measured by the light intensity sensor of the sensor unit being higher than a specified light intensity.

The in-home relay device according to various example embodiments may further include a cooling member comprising a heat dissipating plate and/or a fan configured to dissipate heat inside the housing to the outside of the housing.

The sensor unit may include at least one of an acceleration sensor, a gyro sensor, and a geomagnetic field sensor, capable of measuring a change in the location of the in-home relay device, and the processor may be configured to operate the antenna alignment unit based on the location change measured by the sensor unit being greater than a specified location change.

An electronic device according to various example embodiments may include: a display, a sensor module including at least one sensor; a communication module including communication circuitry, and a processor operatively connected to the display, the sensor module, and the communication module, and the processor may be configured to: confirm a current location, based on at least one of location information received through the sensor module or input location information, confirm the location of a repeater existing within a distance specified based on the current location, and display the direction of the repeater with respect to the current location on the display.

The electronic device according to various example embodiments disclosed herein may further include a camera module including at least one camera electrically connected to the processor, and the processor may be configured to: control the display to display an installation location of an in-home relay device on a real-time image captured through the camera module such that the installation location of the in-home relay device is displayed through augmented reality (AR) using the direction of the repeater.

The processor may be configured to: receive a location at which a wireless signal in an ultra-high frequency (mm-Wave) band transmitted from the repeater can be received and may display the installation location of the in-home relay device, based on the location.

The processor may be configured to: recognize objects captured through the camera module and determine a location at which a wireless signal in an ultra-high frequency band transmitted from the repeater can be received, to display the installation location of the in-home relay device, based on the location.

The processor may be configured to: control the display to display a signal receiving strength of the in-home relay device received through the communication module on the display and may control the communication module to transmit a control signal to the in-home relay device such that the direction of the antenna of the in-home relay device is changed.

The processor may be configured to control the display to display state information of the in-home relay device received through the communication module on the display, and based on at least one of information included in the state information being out of a prestored numerical range, may display the corresponding information on the display.

The processor may be configured to analyze a time zone-specific communication amount of the in-home relay device and transmit a control signal to the in-home relay device through the communication module such that the performance of the in-home relay device is adjusted according to the communication amount.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A relay device configured to wirelessly communicate with a repeater in an ultra-high frequency (mmWave) band, the relay device comprising:
    a housing;
    an antenna provided in the housing;
    an antenna alignment unit comprising a motor and/or circuitry configured to change alignment of the antenna such that a radiation direction of the antenna is changed; and
    at least one processor operatively connected to the antenna and the antenna alignment unit; and
    a communication unit comprising communication circuitry electrically connected to the processor and wirelessly connected to an external electronic device,
    wherein the antenna alignment unit comprises a horizontal alignment unit and a vertical alignment unit, and
        wherein the at least one processor is configured to control the communication unit to receive a directional information of the repeater from the external electronic device, and to control the horizontal alignment unit based on the directional information of the repeater and control the vertical alignment unit based on quality of signals transmitted to or received from the repeater through the antenna, to secure a line of sight (LOS) between the antenna and the repeater.

2. The relay device of claim 1, wherein the horizontal alignment unit is configured to rotate the antenna about a first axis perpendicular to an installation location on which the housing is installed, and the vertical alignment unit is configured to rotate the antenna about a second axis perpendicular to the first axis.

3. The relay device of claim 1, wherein a surface of the housing opposite to the antenna has a substantially sphere shape.

4. The relay device of claim 1, wherein the housing comprises a first housing and a second housing in which the antenna is disposed and which is movable relative to the first housing, and
    the second housing has a substantially sphere-shaped surface opposite to the antenna, and
    the antenna alignment unit is configured to move the second housing relative to the first housing.

5. The relay device of claim 1, wherein the at least one processor is configured to, based on a receiving strength included in the signal quality being lower than a specified receiving strength:
    operate the antenna alignment unit such that the receiving strength is increased to be greater than or equal to the specified receiving strength.

6. The relay device of claim 1, further comprising:
    a sensor unit comprising at least one sensor configured to confirm a state of the relay device; and
    an indicator configured to display state information comprising at least one of the signal quality or information measured by various sensors included in the sensor unit,
    wherein the at least one processor is configured to control the antenna and the antenna alignment unit, based on the information measured by one or more sensors included in the sensor unit.

7. The relay device of claim 6, wherein the sensor unit comprises a temperature sensor configured to measure a temperature of the relay device, and
    wherein the at least one processor is configured to limit performance of at least one of the antenna based on the temperature measured by the temperature sensor being greater than a specified temperature.

8. The relay device of claim 6, wherein the sensor unit comprises a light intensity sensor capable of measuring an amount of light incident to the relay device, and
    wherein the at least one processor is configured to limit performance of the antenna based on light intensity measured by the light intensity sensor being greater than a specified light intensity.

9. The relay device of claim 6, wherein the sensor unit comprises at least one of an acceleration sensor, a gyro sensor, and a geomagnetic field sensor, capable of measuring a position change of the relay device, and
    wherein the at least one processor is configured to operate the antenna alignment unit based on the position change measured by the sensor unit being greater than a specified position change.

* * * * *